(12) United States Patent
Nyzen et al.

(10) Patent No.: US 10,247,190 B2
(45) Date of Patent: *Apr. 2, 2019

(54) ACTUATION METHOD AND EFFICIENCY (71) Applicant: EATON CORPORATION, Cleveland, OH (US)

(72) Inventors: Robert Nyzen, Hiram, OH (US); Martin A. Clements, North Royalton, OH (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 54 days.

This patent is subject to a terminal disclaimer.

(21) Appl. No.: 15/126,190

(22) PCT Filed: Mar. 17, 2015

(86) PCT No.: PCT/US2015/020897
§ 371 (c)(1),
(2) Date: Sep. 14, 2016

(87) PCT Pub. No.: WO2015/187230
PCT Pub. Date: Dec. 10, 2015

(65) Prior Publication Data
US 2017/0107987 A1    Apr. 20, 2017

Related U.S. Application Data (60) Provisional application No. 61/954,484, filed on Mar. 17, 2014.

(51) Int. Cl.
*F04D 15/00* (2006.01)
*F04C 14/02* (2006.01)
(Continued)

(52) U.S. Cl.
CPC ....... *F04D 15/0005* (2013.01); *B64D 37/005* (2013.01); *F02C 7/236* (2013.01);
(Continued)

(58) Field of Classification Search
CPC ........ F04D 1/06; F04D 15/0005; F04C 2/084; B64D 37/005
See application file for complete search history.

(56) References Cited

U.S. PATENT DOCUMENTS 3,433,016 A * 3/1969 Borel .................. F02C 7/22
417/287
3,441,200 A * 4/1969 Huesgen ............. F04D 27/0284
415/47

(Continued)

FOREIGN PATENT DOCUMENTS

WO    WO 2013/025818 A1    2/2013
WO    WO 2013/166122 A2    11/2013

OTHER PUBLICATIONS

PCT/US2015/020897, International Search Report and Written Opinion. dated Dec. 14, 2015.
(Continued)

*Primary Examiner* — Thomas E Lazo
(74) *Attorney, Agent, or Firm* — Fay Sharpe LLP (57) ABSTRACT

A multi-stage centrifugal pump assembly allows for multiple fixed ratio pressure levels. The multiple pressure levels permit optimization of actuation loops without the need for pressure regulators, and can be used directly by the actuators.

21 Claims, 5 Drawing Sheets (51) Int. Cl.
  *B64D 37/00*  (2006.01)
  *F04C 2/08*   (2006.01)
  *F04D 1/06*   (2006.01)
  *F02C 7/236*  (2006.01)

(52) U.S. Cl.
  CPC .............. *F04C 2/084* (2013.01); *F04C 14/02* (2013.01); *F04D 1/06* (2013.01); *F04C 2270/185* (2013.01); *F05D 2260/76* (2013.01)

(56) References Cited

U.S. PATENT DOCUMENTS

| | | |
|---|---|---|
| 5,116,362 A | 5/1992 | Arline et al. |
| 6,022,197 A | 2/2000 | Cygnor et al. |
| 8,166,765 B2 | 5/2012 | Baker et al. |
| 8,291,886 B2 | 10/2012 | Mahoney et al. |
| 2010/0263634 A1 | 10/2010 | Futa, Jr. et al. |

OTHER PUBLICATIONS

EP 15 80 2430, Supplementary European Search Report, completed Nov. 3, 2017.

* cited by examiner

ACTUATION METHOD AND EFFICIENCY

This application claims the priority benefit of U.S. provisional application Ser. No. 61/954,484, filed Mar. 17, 2014.

BACKGROUND

Current aircraft engine actuation loops use fixed pressure levels of fuel to provide a required force for actuation purposes. These fixed pressure levels are generated using pressure regulators. This is an inefficiency in the system due to the pressure loss from pump discharge down to the regulated supply pressure.

The use of fuel on aircraft engines to drive actuation loops is common. These actuation loops are typically supplied from one or more regulated pressure sources and referenced to the low pressure stage of the fuel pump, commonly a centrifugal stage. The need for a fixed differential pressure, provided by pressure regulators, is driven by control needs to avoid large changes in control gains. In order to generate these fixed pressure differentials, discharge pressure from the pump is regulated or allowed to leak through a valve, or pressure regulator. This leakage is an inefficiency in the fuel system.

SUMMARY OF THE DISCLOSURE

An actuation assembly (and the associated method) includes a multistage centrifugal pump and a first control valve. The control valve receives a first pressure from one of the centrifugal pump stages and communicates the first pressure for optimally operating an associated first actuator.

The actuation assembly further includes a second control valve that receives a second pressure from a different centrifugal pump stage and communicates the second pressure for optimally operating an associated second actuator.

In one arrangement, return passages from each control valve return to the same stage of the multistage centrifugal pump.

In another arrangement, the first control valve receives a first pressure from one of the centrifugal pump stages downstream of a first centrifugal pump stage.

In another arrangement, a return passage from the first control valve communicates with the multistage centrifugal pump upstream of the one centrifugal pump stage, particularly with the multistage centrifugal pump upstream of the one centrifugal pump stage.

The return passage from the first control valve communicates with an inlet of the one centrifugal pump stage, and in another arrangement the first control valve communicates with an inlet of a centrifugal pump stage different than the one centrifugal pump stage.

The actuation assembly can include a positive displacement pump downstream of the multistage centrifugal pump.

In an another embodiment, the actuation assembly further includes a selector valve between the one stage of the multistage centrifugal pump and the first control valve through which pressure is alternately supplied to the first control valve from the one stage and the positive displacement pump.

The selector valve may be pressure activated to initially forward pressure to the first control valve from the positive displacement pump and then switch to forward pressure from the one stage once the outlet pressure from the centrifugal pump has reached a certain level.

A primary benefit is the reduction of inefficiencies in engine actuation loops.

Another advantage relates to the elimination of pressure regulators and the associated leakage of flow therepast associated with conventional systems.

Still another benefit is the ability to establish multiple fixed ratio pressure differentials for various actuator needs.

Yet other advantages are associated with optimizing the pressure level used by the actuators, for example, a reduced number of components, reduced/limited waste flow, and lower cost.

Benefits and advantages of the present disclosure will become more apparent from reading and understanding the following detailed description.

DETAILED DESCRIPTION

This disclosure uses a multi-stage centrifugal pump solely, or in conjunction with a positive displacement pump, as an engine main fuel pump. Using a multi-stage centrifugal pump, fixed ratio pressure levels (created between the different pump stages where each stage adds additional energy and pressure to the pumped fluid) are automatically generated and can be used directly by the actuators. This improves the efficiency of the fuel system. Depending on the number of pumping stages, potentially more pressure levels are available for actuation thus allowing for better optimization of the actuators.

The use of multiple centrifugal stages allows for design and optimization of multiple fixed ratio pressure levels. For instance, if there are three centrifugal stages, then there will be three fixed ratio pressures. Typically, the first stage is the reference or drain pressure for the actuators, thereby leaving the remaining stage or stages as supply pressure levels. The ability to have multiple pressure levels allows for additional optimization of the actuation loops without the need for additional pressure regulators. Flow is only drawn from the centrifugal stages when needed therefore improving the efficiency of the system. Additionally, the fixed ratio of pressure allows for conventional control gains.

If the main fuel pump contains only centrifugal stages and there exists a need for actuation movement at low speeds, the pump will need to be motor driven. The use of a positive displacement pump in conjunction with the centrifugal stages allows the system to develop pressure at the low speeds (provided primarily by the positive displacement pump) which can be used to supply the actuation loops. Upon reaching a prescribed level, a shuttle type valve, for example, can be used to transition the system from the positive displacement discharge pressure to the appropriate centrifugal stage discharge pressure.

Figure 1:
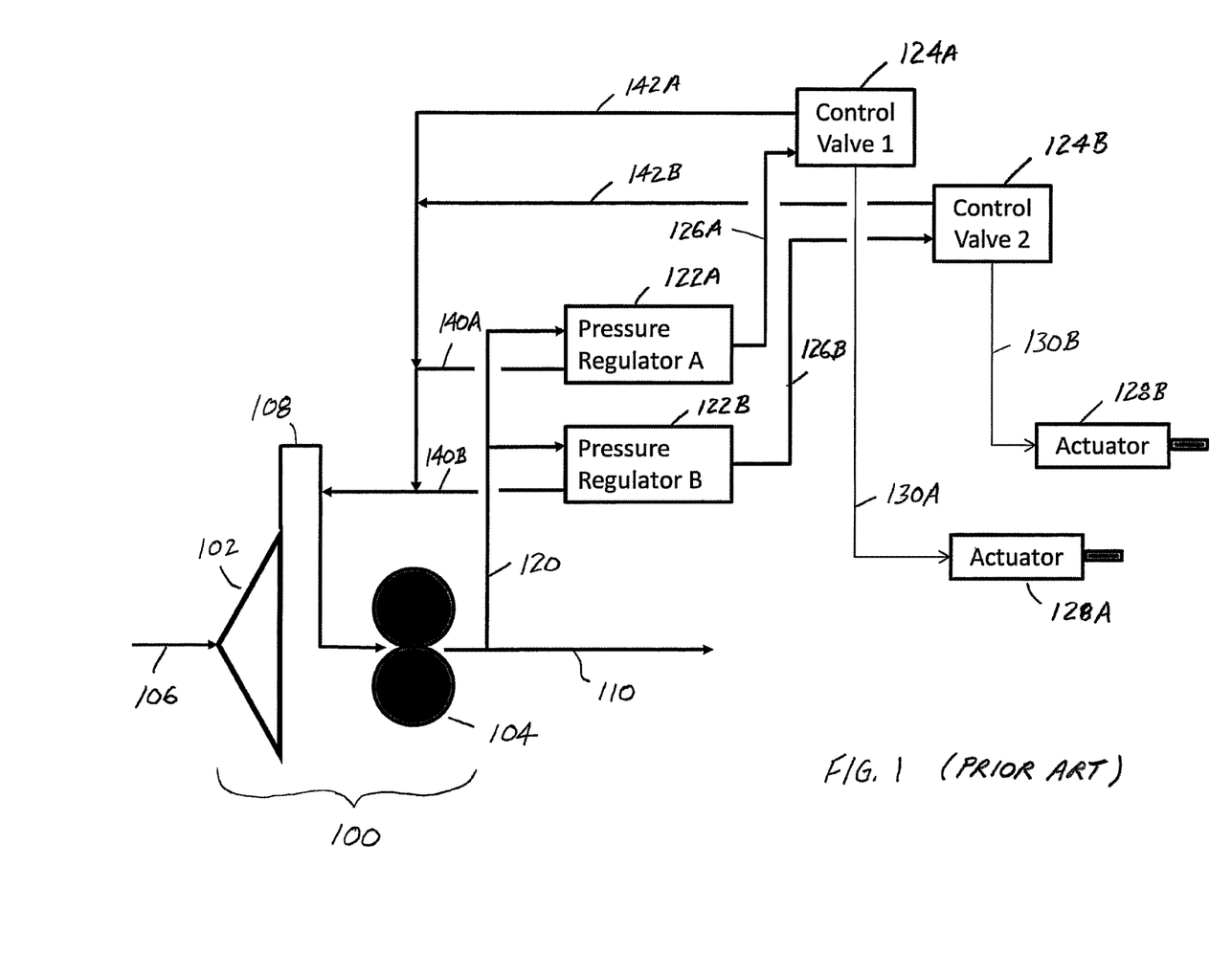
FIG. 1 shows a conventional, prior art arrangement.

For example, shown in FIG. 1 is an engine main fuel pump 100 that includes a centrifugal stage pump 102 and a positive displacement pump such as gear pump 104. Fuel is inlet from passage or line 106 to the centrifugal stage pump 102, pressurized by the centrifugal stage pump, and outlet via passage 108 where it is introduced into the inlet of the gear pump 104. The gear pump 104 further pressurizes the fluid (fuel) where it is provided to the engine (not shown) via passage 110. In addition, branching from the passage 110 is a passage 120 that leads to one or more pressure regulators (two of which are shown as pressure regulator 122A and pressure regulator 122B) for delivery of fuel at reduced pressure levels for control valves 124A, 124B, respectively, via passages 126A, 126B. It will be understood that the individual pressure regulators 122A, 122B can deliver the pressurized fuel at the same or different pressures to the respective control valves 124A, 124B. Each control valve 124A, 124B communicates via a respective passage 130A, 130B with a respective actuator 128A, 128B. In this manner, fuel at a desired pressure level is delivered to the actuators 128A, 128B.

As noted above, discharge pressure from the pump leaks through the valve or the pressure regulator. This leakage flow is returned from the pressure regulators 122A, 122B through passages 140A, 140B, and from the valves 124A, 124B through passages 142A, 142B to passage 108 where the flow combines with flow from the centrifugal pump 102 that is introduced into the gear pump 104.

Figure 2:
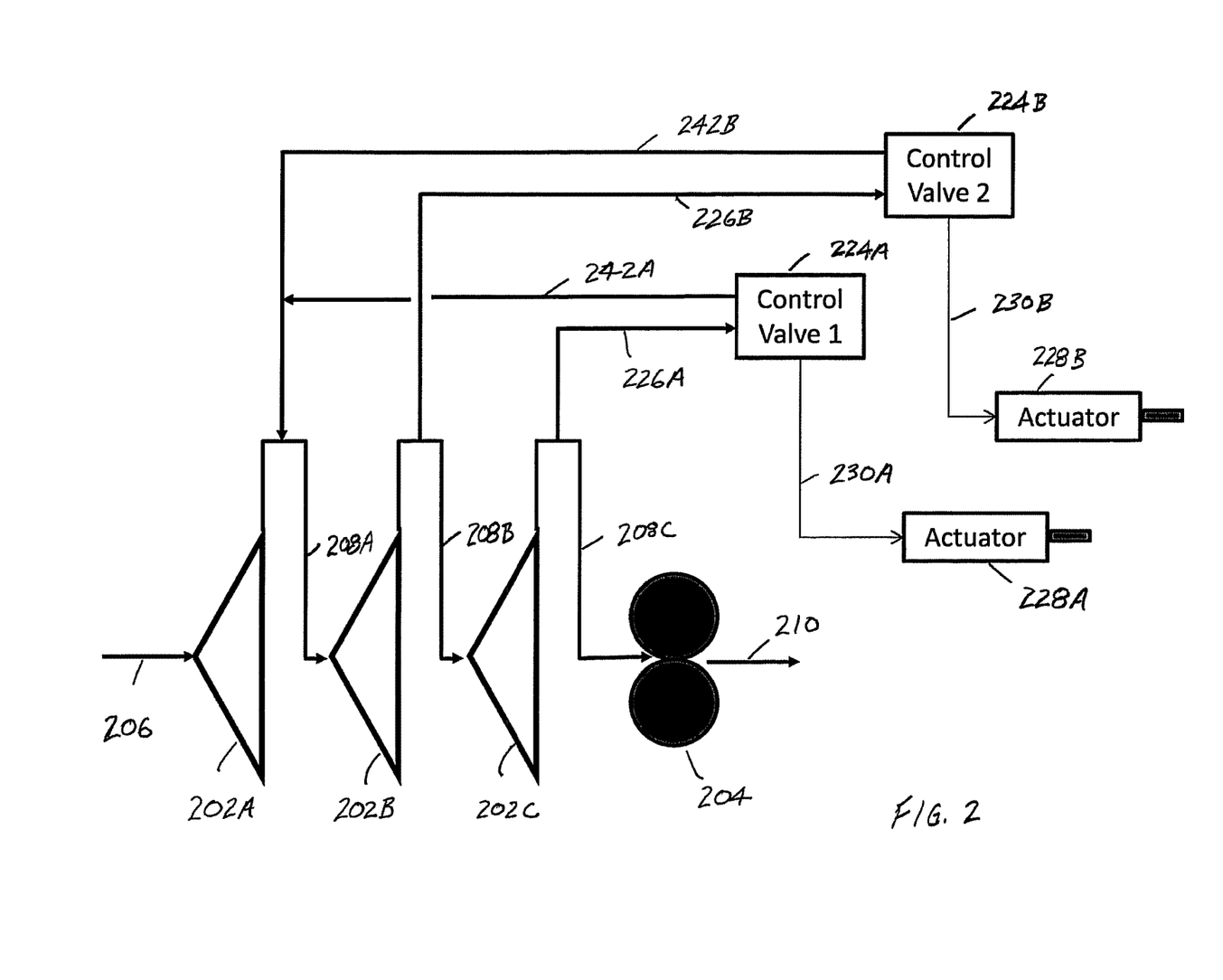
FIGS. 2-5 schematically show multi-stage centrifugal pump arrangements for optimizing multiple fixed ratio pressure levels for actuators.

The new arrangement of FIG. 2 advantageously uses a multi-stage centrifugal pump 202, either alone or with the gear pump 204, in a manner that provides multiple fixed ratio pressure levels. More particularly, the multi-stage centrifugal pump 202 includes a first stage 202A, a second stage 202B, and a third stage 202C arranged in series to incrementally increase the pressure from the first stage to the second stage, and likewise from the second stage to the third stage. Due to the incremental increase in the pressure from one stage to the next, the first stage 202A can be used as the reference pressure, i.e., the return flow from control valves 224A and 224B through passages 242A, 242B, respectively, is directed to the passage 208A disposed between the first and second stages of the multistage centrifugal pump. Inlet pressure to the control valve 224A is taken from passage 208C downstream of the third stage 202C of the centrifugal pump, while inlet pressure to control valve 224B is taken from passage 208B downstream of the second stage 202B of the centrifugal pump. Thus, a greater pressure is provided to the first control valve 224A than to the second control valve 224B in the arrangement of FIG. 2. Moreover, the pressure regulators (122A, 122B) required in the embodiment of FIG. 1 (because the pressure for the actuators is supplied from downstream of the gear pump 104) are eliminated in the arrangement of FIG. 2. Instead, an optimized pressure level from the multistage centrifugal pump is used directly by the actuator, resulting in reduced components or hardware, reduced cost, along with the benefit of reduced or limited waste flow. A further distinction is that with the pressure regulators used in the embodiment of FIG. 1, fixed pressure is provided to the control valves which are not as sensitive to the load. On the other hand, the pressure ratios associated with the embodiment of FIG. 2 are related to the speed of the pump (i.e., the pressure from the particular centrifugal pump stage is dependent on the rotational speed of the centrifugal pump) and oftentimes the loads on the actuators are also speed dependent.

Figure 3:
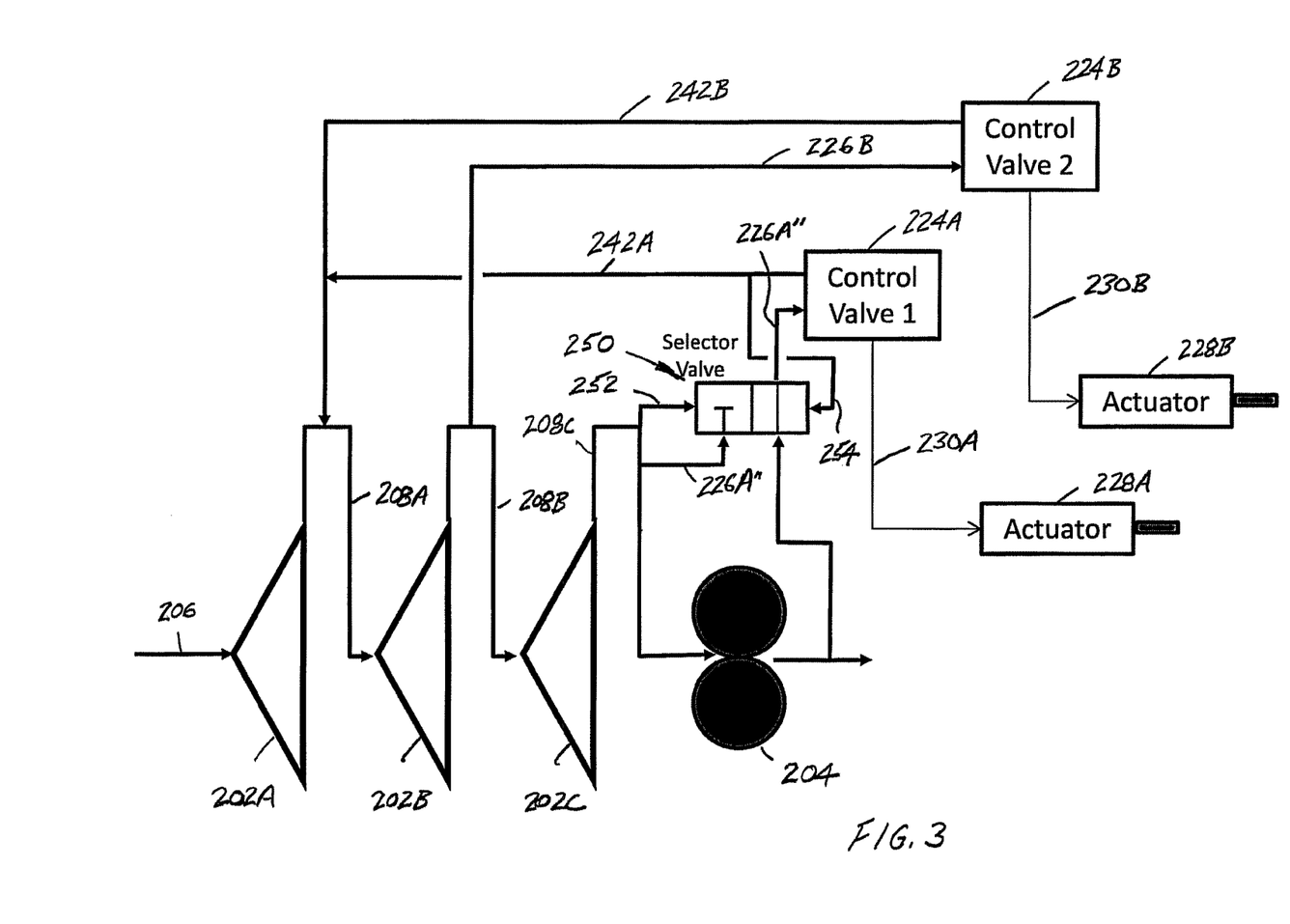

In the slightly modified embodiment of FIG. 3, a two position selector valve or shuttle valve 250 is interposed between the third stage 202C of the centrifugal pump/gear pump 204 and the first control valve 224A. Thus at low speeds, pressure required for the first control valve 224A and the associated actuator 228A is provided from downstream of the gear pump 204, and once the centrifugal pump speed increases (and thus the outlet pressure of the third stage 202C of the centrifugal pump), selector valve 250 moves from the position shown in FIG. 3 to a position where pressure from the outlet of the third stage of the centrifugal pump is supplied to the control valve 224A (and to the associated actuator 228A) through the selector valve 250.

Figure 4:
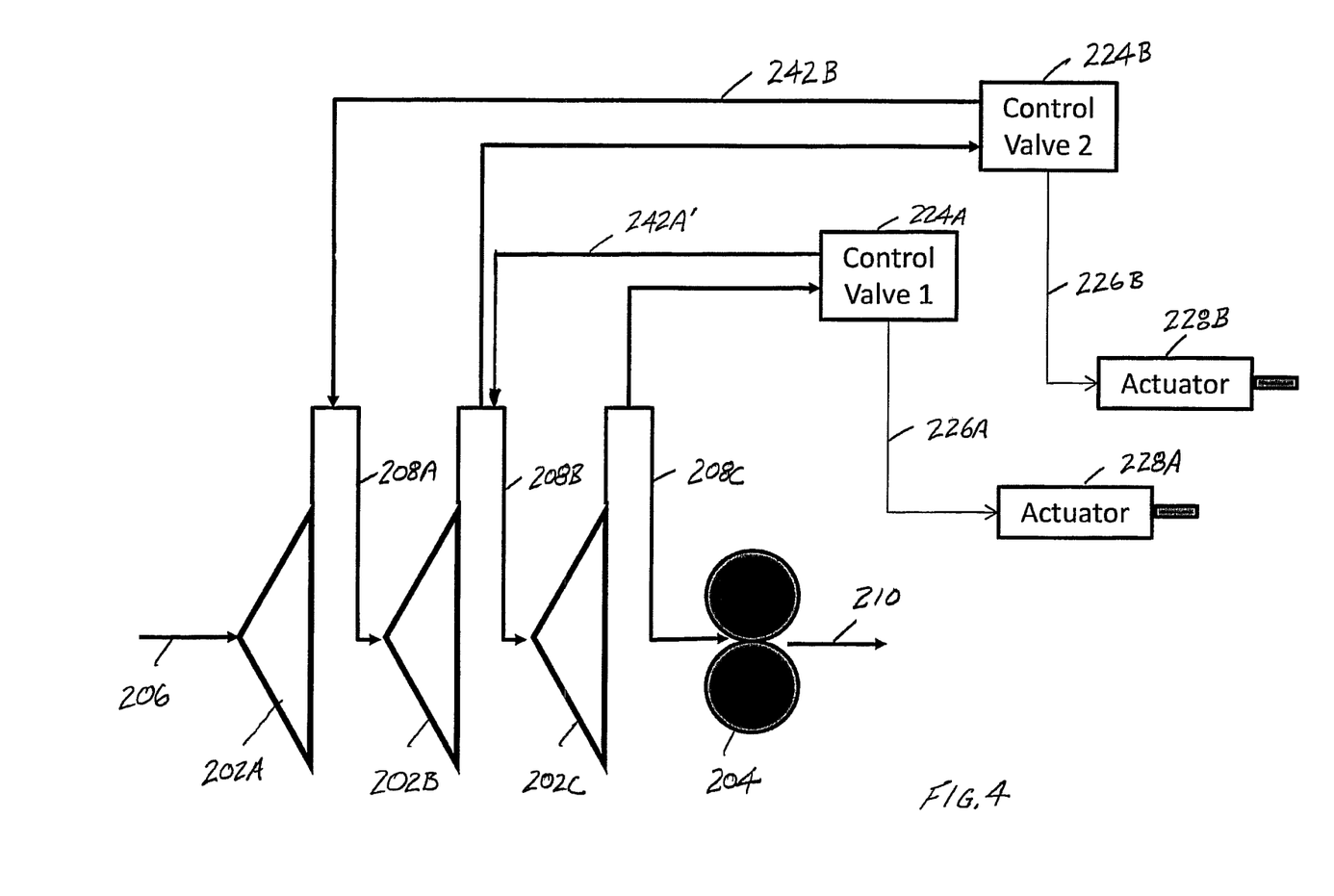
Figure 5:
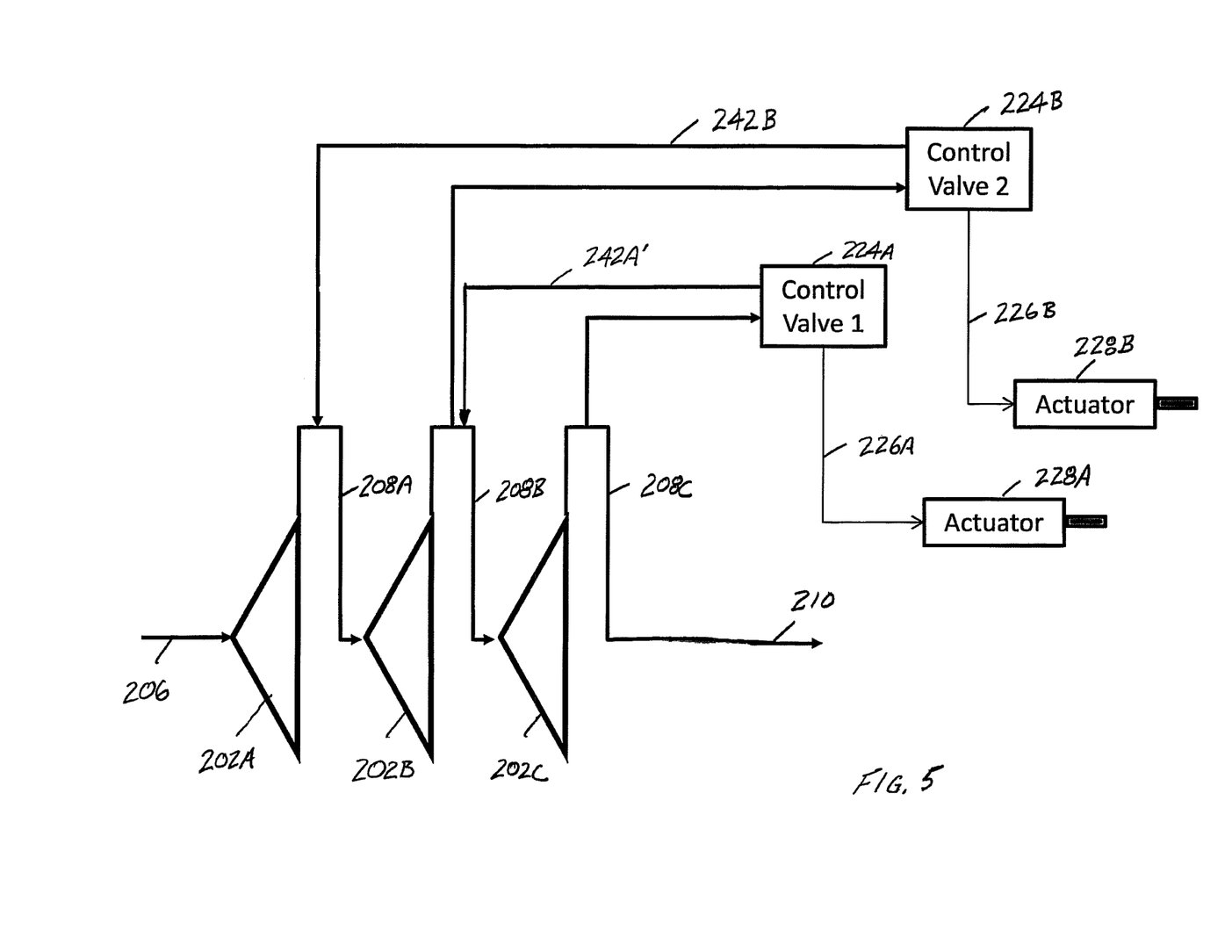

Another modification is shown in FIGS. 4 and 5. Here, the pressure supplied to the control valve 224A comes from the outlet of the third stage 202C of the centrifugal pump. However, the reference pressure for the first control valve 224A is associated with the second stage 202B of the centrifugal pump (and not with the first stage 202A of the centrifugal pump as in the embodiments of FIGS. 2-3). Thus, one skilled in the art will appreciate that whichever output stage of the multistage centrifugal pump most closely matches the pressure requirements for a particular control valve can be selected, and likewise the pressure differential can be optimized to also meet these requirements. FIG. 5 further illustrates the same arrangement of FIG. 4 without use of a positive displacement pump, such as the gear pump 204 of FIG. 4. In all other respects, the system of FIG. 5 is the same.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

We claim:
1. An actuation assembly comprising:
a multistage centrifugal pump that includes at least first and second centrifugal pump stages where an inlet of the second centrifugal pump stage receives flow from an outlet of the first centrifugal pump stage;
a first control valve that receives flow at a first pressure from the second centrifugal pump stage and communicates the first pressure flow for optimally operating an associated first actuator, and a first return line that returns any additional first pressure flow from the second centrifugal pump stage that is directed to the first control valve and not used by the first control valve to the inlet of the second centrifugal pump stage; and
a second control valve that receives a second pressure from the first centrifugal pump stage and communicates the second pressure for optimally operating an associated second actuator, and a second return line that returns any additional second pressure flow from the first centrifugal pump stage that is directed to the second control valve and not used by the second control valve to the inlet of the first centrifugal pump stage.

2. The actuation assembly of claim 1 further comprising a positive displacement pump downstream of the multistage centrifugal pump.

3. The actuation assembly of claim 2 further comprising providing a selector valve between the second centrifugal pump stage of the multistage centrifugal pump and the first control valve through which flow at a first pressure is alternately supplied to the first control valve from the second centrifugal pump stage and the positive displacement pump.

4. An actuation assembly comprising:
a multistage centrifugal pump; and
a first control valve that receives a first pressure from one of the centrifugal pump stages and communicates the first pressure for optimally operating an associated first actuator;
a positive displacement pump downstream of the multistage centrifugal pump
a selector valve between the one stage of the multistage centrifugal pump and the first control valve through which pressure is alternately supplied to the first control valve from the one stage and the positive displacement pump.

5. The actuation assembly of claim 4 further comprising a second control valve that receives a second pressure from a different centrifugal pump stage and communicates the second pressure for optimally operating an associated second actuator.

6. The actuation assembly of claim 5 wherein return passages from each control valve return to the same stage of the multistage centrifugal pump.

7. The actuation assembly of claim 4 wherein the first control valve receives a first pressure from one of the centrifugal pump stages downstream of a first centrifugal pump stage.

8. The actuation assembly of claim 4 wherein a return passage from the first control valve communicates with the multistage centrifugal pump upstream of the one centrifugal pump stage.

9. The actuation assembly of claim 8 wherein the return passage from the first control valve communicates with an inlet of the one centrifugal pump stage.

10. The actuation assembly of claim 8 wherein the return passage from the first control valve communicates with an inlet of a centrifugal pump stage different than the one centrifugal pump stage.

11. The actuation assembly of claim 4 wherein the selector valve is pressure activated to initially forward pressure to the first control valve from the positive displacement pump and then switch to forward pressure from the one stage once the outlet pressure from the centrifugal pump has reached a certain level.

12. A method of operating an actuator comprising:
providing a multistage centrifugal pump that includes at least first and second centrifugal pump stages where an inlet of the second centrifugal pump stage receives flow from an outlet of the first centrifugal pump stage; and
directing flow at a first pressure from the second centrifugal pump stage of the multistage centrifugal pump to a first control valve for optimally operating an associated first actuator associated with the first control valve;
returning any additional first pressure flow from the second centrifugal pump stage that is directed to the first control valve and not used by the first control valve via a first return line to the inlet of the second centrifugal pump stage;
directing flow at a second pressure from the first centrifugal pump stage of the multistage centrifugal pump to a second control valve for optimally operating an associated second actuator with the second control valve; and
returning any additional second pressure flow from the first centrifugal pump stage that is directed to the second control valve and not used by the second control valve via a second return line to the inlet of the first centrifugal pump stage.

13. A method of operating an actuator comprising:
providing a multistage centrifugal pump; and
directing a first pressure from one stage of a multistage centrifugal pump to a control valve for optimally operating an associated first actuator associated with the control valve; and
providing a selector valve between the one stage of the multistage centrifugal pump and the first control valve through which pressure is alternately supplied to the first control valve from the one stage and the positive displacement pump, wherein the selector valve is pressure activated, initially forwarding pressure to the first control valve from the positive displacement pump and then switching to forward pressure from the one stage once the outlet pressure from the centrifugal pump has reached a certain level.

14. The method of claim 13 further comprising providing a second control valve that receives a second pressure from a different centrifugal pump stage and communicating the second pressure for optimally operating an associated second actuator.

15. The method of claim 14 further comprising providing return passages from each control valve to the same stage of the multistage centrifugal pump.

16. The method of claim 13 further comprising directing a first pressure from one of the centrifugal pump stages downstream of a first centrifugal pump stage to a first control valve.

17. The method of claim 13 further comprising providing a return passage from the first control valve that communicates with the multistage centrifugal pump upstream of the one centrifugal pump stage.

18. The method of claim 17 further comprising connecting the return passage from the first control valve with an inlet of the one centrifugal pump stage.

19. The method of claim 17 further comprising connecting the return passage from the first control valve with an inlet of a centrifugal pump stage different than the one centrifugal pump stage.

20. The method of claim 13 further comprising providing a positive displacement pump downstream of the multistage centrifugal pump.

21. The method of claim 20 further comprising providing a selector valve between the one stage of the multistage centrifugal pump and the first control valve through which pressure is alternately supplied to the first control valve from the one stage and the positive displacement pump.

* * * * *

UNITED STATES PATENT AND TRADEMARK OFFICE
CERTIFICATE OF CORRECTION

PATENT NO. : 10,247,190 B2
APPLICATION NO. : 15/126190
DATED : April 2, 2019
INVENTOR(S) : Robert Nyzen and Martin A. Clements

Page 1 of 1

It is certified that error appears in the above-identified patent and that said Letters Patent is hereby corrected as shown below:

On the Title Page

Item (*) Notice: please remove statement below:
This patent is subject to a terminal disclaimer.

Signed and Sealed this
Third Day of September, 2019

Andrei Iancu
*Director of the United States Patent and Trademark Office*